March 26, 1929.   G. FORNACA   1,706,394
LIQUID OPERATED BRAKE FOR MOTOR VEHICLES
Filed Feb. 28, 1923   2 Sheets-Sheet 1

INVENTOR
Guido Fornaca
BY
Edwards, Sager & Bower
his ATTORNEY

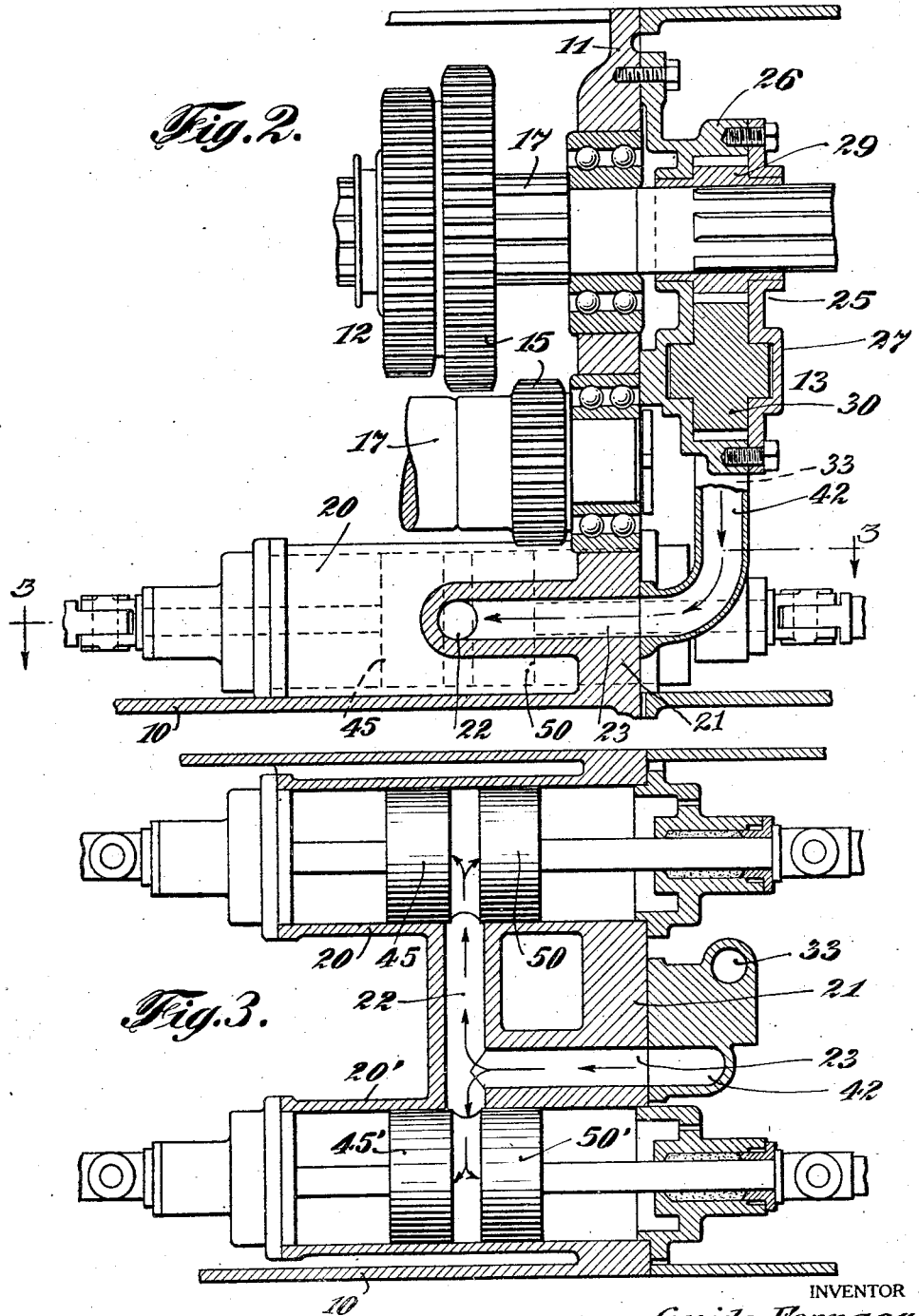

Patented Mar. 26, 1929.

1,706,394

UNITED STATES PATENT OFFICE.

GUIDO FORNACA, OF TURIN, ITALY.

LIQUID-OPERATED BRAKE FOR MOTOR VEHICLES.

Application filed February 28, 1923, Serial No. 621,747, and in Italy February 28, 1922.

This invention relates to liquid operated brakes for motor vehicles in which the movement of the engine itself furnishes the necessary braking energy.

Under the present invention the brake pump and brake cylinders are disposed in the gear box, and the lubricating oil serving to lubricate the speed gear is used as the means of transmission of energy between the pump and the brake cylinders. In the form of my invention herein disclosed, the pump normally runs idly taking oil from the body of oil in the gear case and returning it thereto. The discharge passage from the pump is provided with a manually operated valve which may be moved to restrict or close the passage between the discharge side of the pump and the body of oil in the gear case. When this valve is operated to restrict or shut off the flow of oil, pressure is created at the discharge side of the pump and this forces oil into the brake cylinders and operates the brakes.

The improved brake operating means designed in accordance with my invention is simple and inexpensive in construction. It consists of a few parts, all of which are readily made and assembled. The parts when assembled are readily accessible for repair or adjustment and the device as a whole is durable and economical and efficient in operation.

In order that the invention may be more clearly understood, reference is made to the annexed drawing which shows by way of example one embodiment of the invention, and in which:

Fig. 2 is a longitudinal section on the line 2—2, Fig. 1,

Fig. 3 is a sectional plan on the line 3—3 of Fig. 2.

Figure 1:
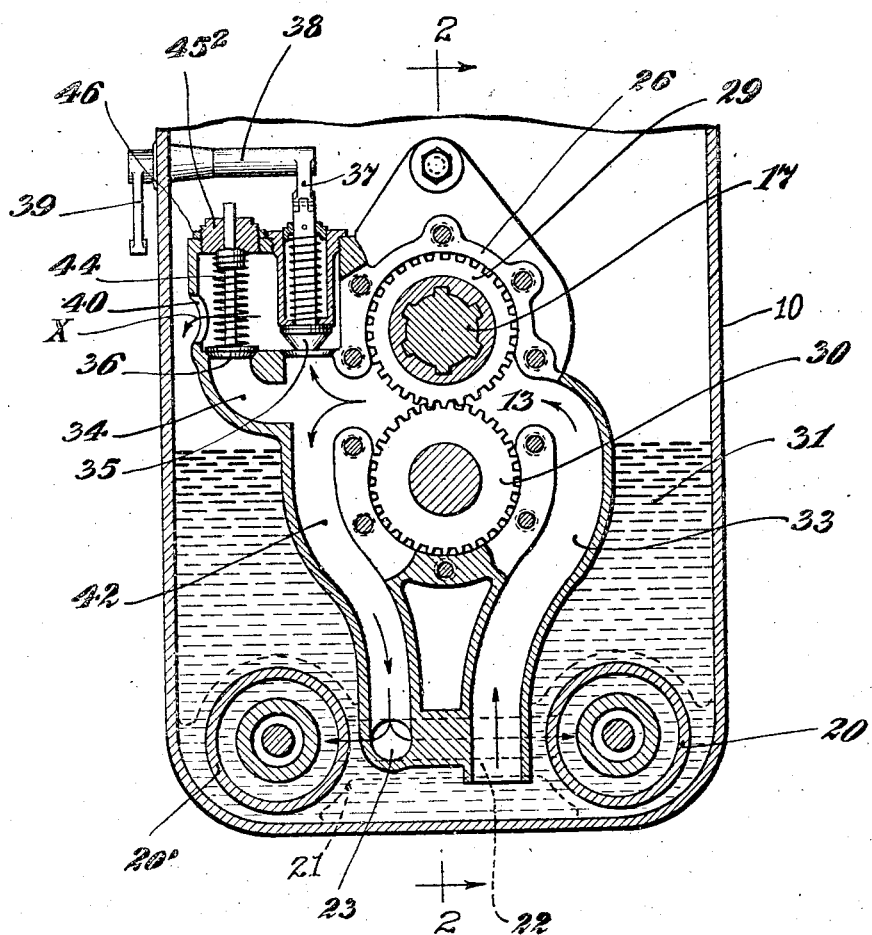
Fig. 1 is a transverse section of the pump.

Referring to the drawing, the transmission case or gear box 10 is divided by means of a vertical partition 11 into a transmission compartment 12 and a pumping compartment 13. The transmission compartment contains the transmission gears 15 carried by shafts 17, journaled in the partition 11. Cast integrally with the bottom of the gear box are two brake operating cylinders 20 and 20', which are connected by a portion 21 formed with a transverse passage 22 communicating with the interior of the cylinders 20 and 20' at points approximately midway between their ends, and also with a passage 23 which extends as shown from the face of the casting to the passage 22. The cylinders 20 and 20' and the intermediate portion 21 form a part of the partition 11 and as shown, the cylinders extend along the bottom of the transmission compartment.

The pump 25, which is of the gear type, has a casing formed of a casting 26 of generally flat form, secured against the partition 11 and a cover plate 27 secured to the casting 26. Journaled in the casing are pump gears 29 and 30, the gear 29 being keyed to and operated by the transmission shaft.

The oil in the gear box which is primarily intended for the lubrication of the gears, is also used, as mentioned, for the purpose of transmitting the energy from the pump to the brake. It is sucked up from the body of oil 31 in the compartment 13 through passage 33 and discharged into the chamber 34, where valves 35 and 36 are situated. The valve 35 is hand or foot operated by means of an internal lever 37 secured to a shaft 38 and an external lever 39 likewise secured to the shaft 38 outside of the gear box. Oil passing through the valve 35 when in its normal or non-braking position, passes through a discharge opening 40 back to the body of oil in the gear box as indicated by the arrow X in Figure 1. Leading from the chamber 34 to the passage 23 in the portion 21 of the gear box casting is a passage 42 through which oil is forced for the purpose of operating the brakes when the valve 35 has been moved to close or restrict the return flow of oil to the gear box. Valve 36 is a safety valve and acts as required by regulating the tension of the spring 44 by means of a guide 45² and a locknut 46, to prevent an excessive rise of pressure on the discharge side of the pump. As will be seen from Fig. 1, both valves 35 and 36 are removable through the top of the pump casing without the necessity of disturbing the other parts of the brake operating means.

The brakes are operated by four pistons, 45, 50, 45' and 50', located as shown in the cylinders 20 and 20' on opposite sides of the passage 22. The pistons in each cylinder have piston rods extending through opposite ends of the cylinder and these rods are connected by suitable levers and bars to the brakes. The construction shown is particularly adapted for use with a vehicle having four brakes, one for each road wheel, in which case each of the brakes will be actuated by one of the pistons.

The operation of the invention is as follows:

Normally, the oil is sucked up by the pump 25 through the passage 33 and discharged into the chamber 34, from which it passes through the open valve 35 and returns to the gear box through the discharge opening 40. Under these circumstances, the resistance offered by the opening 40 and opening at the valve 35 being practically nil, the pressure in the passages 42, 23 and 22 and in the cylinders 20 and 20' is also practically nil and as a result, no movement of the pistons takes place. When the valve 35 is moved to restrict the passage of oil through its opening, the pressure in the passages 42, 23 and 22 and in the cylinders 20 and 20' increases in proportion so that the pistons are caused to move, the space between the pistons being continually supplied with oil by the pump.

It will be noted that the pump which comprises the gears, casing and valves, is screwed or bolted to the partition 11 of the gear box and is completely enclosed in the compartment 13 which contains the necessary oil for the functioning of the device. This arrangement facilitates assembling, increases accessibility and aids in its efficient action.

It will be noted that the valve 35 is so constructed that in closing, it operates against the pressure of the liquid in the chamber 34. This pressure is felt by the operator in moving the valve and in this manner he is given an indication as to the pressure in the chamber 34 and the extent of braking action and enables him to adjust the position of the valve accordingly.

It is, of course, possible to vary the details embodied in the construction of the device described without departing from the scope of this invention.

Having now particularly described and ascertained the nature of my invention and in what manner the same is to be performed, I claim:

1. In a motor vehicle having brakes, a transmission casing containing lubricating oil, a transmission shaft in said casing, a brake operating cylinder, a piston therein having a rod extending through one end thereof, said cylinder being rigid with said casing and submerged in the oil therein, a pump in said casing operated from said shaft and connections whereby said pump receives oil from said casing and delivers it to said cylinder to operate the brakes.

2. In a motor vehicle, a transmission shaft and a transmission casing containing a body of lubricating oil, brake operating means submerged in the oil in said casing, said means comprising a brake cylinder rigid with said casing and a piston in said cylinder, operating connections from said piston comprising a piston rod extending through one end of said cylinder into the body of oil in said casing, said cylinder end having communication with said casing and means operated from said shaft for drawing oil from the body of oil in said casing and delivering it to said cylinder for moving said piston.

3. In a motor vehicle, a transmission shaft and casing, a brake cylinder in said casing and integral with bottom thereof, a vertical partition in said casing formed in part by said brake cylinder and a gear pump secured to said partition and operated from said shaft and connections whereby oil is drawn by said pump from said casing and delivered to said cylinder.

4. In a motor vehicle, a casing adapted to contain oil, a partition dividing said casing into two compartments, transmission gearing in one of the said compartments, a pump in the other of said compartments operated from said transmission, a brake cylinder secured to the lower part of said partition and extending along the bottom of said transmission compartment and connections to said pump whereby the pump receives oil from said casing and delivers it to said cylinder.

5. In a motor vehicle, a casing adapted to contain oil, a partition dividing said casing into two compartments, transmission gearing in one of said compartments, a pump in the other of said compartments operated from said transmission, a brake cylinder secured to the lower part of said partition and cast integrally with the bottom of said casing.

6. In a motor vehicle, a casing adapted to contain oil, a transverse partition dividing said casing into two compartments, transmission gearing in one of said compartments journaled in said partition, two brake cylinders formed integrally with the bottom of said casing and extending from said partition into said transmission compartment, two spaced pistons in each of said cylinders having rods extending through opposite ends of the cylinder, brake operating connections for each rod, a gear pump in the other of said compartments, said pump being secured to said partition and being driven from said gearing, said pump having an inlet passage communicating with the interior of said casing and an outlet passage communicating with the space between the pistons of each cylinder and manually operated means for restricting the return flow from said pump to said casing.

7. In a motor vehicle, a transmission casing having brake cylinders cast integrally with the bottom thereof and adapted to have their ends submerged in the lubricating oil in said casing, two spaced pistons in each cylinder, said casing being formed with a passage joining the space between the pistons and a passage communicating with said first named passage and a pump in casing having an inlet in communication with the interior of said casing and an outlet communicating with said last named passage, and means for venting said outlet to the interior of said casing.

8. In a motor vehicle, a transmission casing having a wall and a transmission shaft journaled therein, a gear pump in said casing formed of a casting of generally flat form secured to said wall and a cover plate secured to said casting, pump gears journaled in said casting and plate, one of said gears being mounted upon and operated by said transmission shaft, said pump having an outlet and a downwardly extending intake passage adapted to draw oil continuously from said casing whenever said pump gears are rotating, a reciprocating control valve in said outlet removably mounted in said casing and brake operating means communicating with said outlet.

9. In a motor vehicle, transmission gearing, a casing having a vertical wall formed in part by a brake operating cylinder and having a passage extending from the face of said wall to said cylinder, a transmission shaft extending through said wall above said cylinder, a gear pump having a casing secured against said wall and formed with an outlet passage communicating with the passage in said wall and having pump gears, one of which is mounted on said shaft and a control valve for said pump removably mounted on the top thereof.

10. In a motor vehicle, a transmission casing having a casting forming a partition therein and forming a brake cylinder which lies inside and along the bottom of said casing, said casting being formed with a bore which extends from one face of said partition to the interior of said brake cylinder, a brake operating piston in said cylinder, a gear pump in said casing, comprising a casting of generally flat form secured against the said face of said partition, said gear pump casting being formed with an inlet passage adapted to receive oil from the lower portion of said casing, and an outlet passage terminating at the said face of said partition and communicating at that point with the bore in said first named casting, said gear pump casting being formed at its upper portion with an opening which places said outlet passage in free communication with the interior of said casing outside said pump, and manual means for closing said opening.

In witness whereof, I have hereunto signed my name.

ING. GUIDO FORNACA.